United States Patent
Reed et al.

(10) Patent No.: US 10,030,558 B2
(45) Date of Patent: Jul. 24, 2018

(54) POWER GENERATION SYSTEM EXHAUST COOLING

(71) Applicant: General Electric Company, Schenectady, NY (US)

(72) Inventors: Robert Joseph Reed, Simpsonville, SC (US); Lewis Berkley Davis, Jr., Niskayuna, NY (US); Parag Prakash Kulkarni, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 14/753,077

(22) Filed: Jun. 29, 2015

(65) Prior Publication Data
US 2016/0376955 A1    Dec. 29, 2016

(51) Int. Cl.
*F02G 3/00* (2006.01)
*F01N 3/05* (2006.01)
(Continued)

(52) U.S. Cl.
CPC ............. *F01N 3/05* (2013.01); *F01D 25/305* (2013.01); *F01N 3/2066* (2013.01); *F02C 3/04* (2013.01);
(Continued)

(58) Field of Classification Search
CPC ........ F01D 25/305; F01N 3/05; F01N 3/2066; F02C 3/04; F02C 6/08; F02C 9/18; F05D 2220/32; F05D 2270/082
See application file for complete search history.

(56) References Cited

U.S. PATENT DOCUMENTS 2,627,927 A   2/1953  Mergen
3,677,012 A * 7/1972  Batscha .................. F02K 3/065
                                                          60/262
(Continued)

FOREIGN PATENT DOCUMENTS

CH        679236 A5   1/1992
EP     1 643 113 A2   4/2006
(Continued)

OTHER PUBLICATIONS

Reed et al., filed Jun. 29, 2015, U.S. Appl. No. 14/753,088.
(Continued)

*Primary Examiner* — Jesse Bogue
(74) *Attorney, Agent, or Firm* — Ernest Cusick; Hoffman Warnick LLC (57) ABSTRACT

An airflow system for a gas turbine system according to an embodiment includes: a compressor component of a gas turbine system; an airflow generation system for attachment to a rotatable shaft of the gas turbine system, the airflow generation system and the compressor component drawing in an excess flow of air through an air intake section; a mixing area for receiving an exhaust gas stream produced by the gas turbine system; an air extraction system for: extracting at least a portion of the excess flow of air generated by the airflow generation system and the compressor component to provide bypass air; and diverting the bypass air into the mixing area to reduce a temperature of the exhaust gas stream; and an exhaust processing system for processing the reduced temperature exhaust gas stream.

10 Claims, 5 Drawing Sheets

(51) Int. Cl.
*F01D 25/30* (2006.01)
*F02C 6/08* (2006.01)
*F02C 9/18* (2006.01)
*F01N 3/20* (2006.01)
*F02C 3/04* (2006.01)

(52) U.S. Cl.
CPC ............... *F02C 6/08* (2013.01); *F02C 9/18* (2013.01); *F05D 2220/32* (2013.01); *F05D 2270/082* (2013.01)

(56) References Cited

U.S. PATENT DOCUMENTS

| | | | |
|---|---|---|---|
| 3,922,850 | A | 12/1975 | McCabe |
| 3,968,647 | A | 7/1976 | Boudigues |
| 3,998,047 | A | 12/1976 | Walker |
| 4,064,692 | A | 12/1977 | Johnson et al. |
| 4,068,471 | A | 1/1978 | Simmons |
| 4,069,661 | A * | 1/1978 | Rundell ............ F02K 3/075 60/204 |
| 4,085,583 | A | 4/1978 | Klees |
| 4,131,432 | A | 12/1978 | Sato et al. |
| 4,165,609 | A | 8/1979 | Rudolph |
| 4,175,384 | A | 11/1979 | Wagenknecht et al. |
| 4,183,210 | A | 1/1980 | Snell |
| 4,222,233 | A * | 9/1980 | Johnson ............ B64C 29/005 60/225 |
| 4,292,008 | A | 9/1981 | Grosjean et al. |
| 4,292,802 | A | 10/1981 | Snow |
| 4,555,902 | A | 12/1985 | Pilarczyk |
| 4,813,229 | A | 3/1989 | Simmons |
| 4,875,436 | A | 10/1989 | Smith et al. |
| 4,892,269 | A | 1/1990 | Greco et al. |
| 4,907,406 | A | 3/1990 | Kirikami et al. |
| 4,961,312 | A * | 10/1990 | Simmons ............ F02C 7/18 60/204 |
| 4,982,564 | A | 1/1991 | Hines |
| 5,014,508 | A | 5/1991 | Lifka |
| 5,113,649 | A * | 5/1992 | Siedlecki, Jr. ............ F02C 7/18 60/226.3 |
| 5,255,505 | A | 10/1993 | Cloyd et al. |
| 5,279,109 | A * | 1/1994 | Liu ............ F02C 7/052 60/39.092 |
| 5,473,898 | A | 12/1995 | Briesch |
| 5,632,142 | A | 5/1997 | Surette |
| 5,809,772 | A | 9/1998 | Giffin, III et al. |
| 6,161,768 | A | 12/2000 | Gordon et al. |
| 6,250,061 | B1 | 6/2001 | Orlando |
| 6,543,234 | B2 * | 4/2003 | Anand ............ F02C 7/32 60/39.182 |
| 6,612,114 | B1 | 9/2003 | Klingels |
| 6,786,034 | B2 | 9/2004 | Liebig et al. |
| 6,798,079 | B2 | 9/2004 | Nelson et al. |
| 7,493,769 | B2 | 2/2009 | Jangili |
| 7,622,094 | B2 | 11/2009 | Lewis et al. |
| 7,730,714 | B2 * | 6/2010 | Wood ............ F01D 17/162 60/226.1 |
| 7,966,825 | B2 | 6/2011 | Judd |
| 8,015,826 | B2 | 9/2011 | Myers et al. |
| 8,186,152 | B2 | 5/2012 | Zhang et al. |
| 8,261,528 | B2 | 9/2012 | Chillar et al. |
| 8,365,510 | B2 | 2/2013 | Lugg |
| 8,549,833 | B2 | 10/2013 | Hyde et al. |
| 2002/0124568 | A1 | 9/2002 | Mikkelsen et al. |
| 2002/0129608 | A1 | 9/2002 | Anand et al. |
| 2003/0182944 | A1 | 10/2003 | Hoffman et al. |
| 2005/0150229 | A1 | 7/2005 | Baer et al. |
| 2005/0235649 | A1 | 10/2005 | Baer et al. |
| 2007/0101696 | A1 | 5/2007 | Dooley |
| 2007/0130952 | A1 | 6/2007 | Copen |
| 2007/0271929 | A1 | 11/2007 | Berry |
| 2008/0116054 | A1 | 5/2008 | Leach et al. |
| 2008/0253881 | A1 | 10/2008 | Richards |
| 2010/0005806 | A1 | 1/2010 | Donnelly |
| 2010/0024379 | A1 | 2/2010 | Sengar et al. |
| 2010/0064655 | A1 | 3/2010 | Zhang et al. |
| 2010/0107600 | A1 | 5/2010 | Hillel et al. |
| 2010/0126182 | A1 | 5/2010 | Hoover et al. |
| 2010/0215558 | A1 | 8/2010 | Kraemer |
| 2010/0247297 | A1 | 9/2010 | Legare et al. |
| 2011/0030331 | A1 | 2/2011 | Tong et al. |
| 2011/0036066 | A1 * | 2/2011 | Zhang ............ F01D 25/305 60/39.5 |
| 2011/0067385 | A1 | 3/2011 | Hirata et al. |
| 2011/0138771 | A1 | 6/2011 | Feller et al. |
| 2011/0158876 | A1 | 6/2011 | Buzanowski et al. |
| 2012/0171020 | A1 | 7/2012 | Peck et al. |
| 2013/0005237 | A1 | 1/2013 | Baten et al. |
| 2013/0025254 | A1 | 1/2013 | Kurosaka et al. |
| 2013/0031910 | A1 | 2/2013 | Merchant et al. |
| 2013/0125557 | A1 | 5/2013 | Scipio et al. |
| 2013/0318941 | A1 | 12/2013 | Ekanayake et al. |
| 2013/0318965 | A1 * | 12/2013 | Ekanayake ............ F02B 47/08 60/605.1 |
| 2013/0318984 | A1 * | 12/2013 | Ekanayake ............ F02C 6/12 60/772 |
| 2013/0318987 | A1 * | 12/2013 | Ekanayake ............ F02C 6/00 60/772 |
| 2013/0318997 | A1 | 12/2013 | Conchieri et al. |
| 2014/0090354 | A1 | 4/2014 | Scipio et al. |
| 2014/0150447 | A1 | 6/2014 | Ekanayake et al. |
| 2014/0165583 | A1 | 6/2014 | Oliverio |
| 2014/0208765 | A1 | 7/2014 | Ekanayake et al. |
| 2014/0230433 | A1 | 8/2014 | Yacoub |
| 2014/0230444 | A1 | 8/2014 | Hao et al. |
| 2014/0234073 | A1 | 8/2014 | Moreton et al. |
| 2015/0047359 | A1 | 2/2015 | Maguire et al. |
| 2015/0089955 | A1 * | 4/2015 | Knapp ............ F02C 6/08 60/782 |
| 2015/0121842 | A1 * | 5/2015 | Moes ............ B64D 13/06 60/204 |
| 2015/0143811 | A1 | 5/2015 | Pang et al. |
| 2015/0252683 | A1 | 9/2015 | Hasting et al. |
| 2016/0169119 | A1 | 6/2016 | Musci et al. |
| 2016/0201605 | A1 | 7/2016 | Brandstein et al. |
| 2016/0230658 | A1 * | 8/2016 | Hanlon ............ F01D 25/30 |
| 2016/0326878 | A1 | 11/2016 | Morimoto et al. |
| 2016/0348560 | A1 | 12/2016 | Sato et al. |
| 2016/0376908 | A1 | 12/2016 | Reed et al. |
| 2016/0376909 | A1 | 12/2016 | Kulkarni et al. |
| 2016/0376954 | A1 | 12/2016 | Davis, Jr. et al. |
| 2016/0376956 | A1 | 12/2016 | Kulkarni et al. |
| 2016/0376957 | A1 | 12/2016 | Kulkarni et al. |
| 2016/0376958 | A1 | 12/2016 | Davis, Jr. et al. |
| 2016/0376959 | A1 | 12/2016 | Davis, Jr. et al. |
| 2016/0376960 | A1 | 12/2016 | Reed et al. |
| 2016/0376961 | A1 | 12/2016 | Kulkarni et al. |
| 2016/0376967 | A1 | 12/2016 | Kulkarni et al. |
| 2016/0376991 | A1 | 12/2016 | Davis, Jr. et al. |
| 2016/0376992 | A1 | 12/2016 | Davis, Jr. et al. |
| 2016/0376994 | A1 | 12/2016 | Kulkarni et al. |
| 2017/0342911 | A1 | 11/2017 | Kulkarni et al. |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 | 6/2013 |
| WO | 2012/092215 A1 | 7/2012 |

OTHER PUBLICATIONS

Davis et al., filed Jun. 29, 2015, U.S. Appl. No. 14/753,064.
Davis et al., filed Jun. 29, 2015, U.S. Appl. No. 14/753,066.
Davis et al., filed Jun. 29, 2015, U.S. Appl. No. 14/753,072.
Kulkarni et al., filed Jun. 29, 2015, U.S. Appl. No. 14/753,073.
Kulkarni et al., filed Jun. 29, 2015, U.S. Appl. No. 14/753,074.
Kulkarni et al., filed Jun. 29, 2015, U.S. Appl. No. 14/753,080.
Kulkarni et al., filed Jun. 29, 2015, U.S. Appl. No. 14/753,085.

(56) References Cited

OTHER PUBLICATIONS

Kulkarni et al., filed Jun. 29, 2015, U.S. Appl. No. 14/753,093.
Davis et al., filed Jun. 29, 2015, U.S. Appl. No. 14/753,102.
Kulkarni et al., filed Jun. 29, 2015, U.S. Appl. No. 14/753,107.
Davis et al., filed Jun. 29, 2015, U.S. Appl. No. 14/753,097.
Reed et al., filed Jun. 29, 2015, U.S. Appl. No. 14/753,105.
U.S. Appl. No. 14/753,073, Office Actionl dated Dec. 13, 2016, 16 pages.
U.S. Appl. No. 14/753,064, Office Action 1 dated Jan. 19, 2017, 24 pages.
U.S. Appl. No. 14/753,066, Office Action 1 dated Feb. 24, 2017, 33 pages.
U.S. Appl. No. 14/753,072, Office Action 1 dated Feb. 24, 2017, 34 pages.
U.S. Appl. No. 14/753,074, Office Action 1 dated Mar. 10, 2017, 41 pages.
U.S. Appl. No. 14/753,093, Office Action 1 dated Jun. 1, 2017, 40 pages.
U.S. Appl. No. 14/753,064, Final Office Action 1 dated Jun. 2, 2017, 31 pages.
U.S. Appl. No. 14/753,073, Final Office Action 1 dated Jun. 20, 2017, 28 pages.
U.S. Appl. No. 14/753,088, Office Action 1 dated Jun. 28, 2017, 37 pages.
U.S. Appl. No. 14/753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,074, Notice of Allowance dated Sep. 18, 2017, 31 pages.
U.S. Appl. No. 14/753,064, Notice of Allowance dated Sep. 21, 2017, 10 pages.
Licata A., et al., "Viability of SCR on Simple Cycle Frame Gas Turbines," Licata Energy & Environmental Consultants, Inc., Yonkers, NY, Power Gen. 2014, Dec. 9-11, 2014, pp. 1-13.
"Turbofan," From Wikipedia, the free encyclopedia, Retrieved from the Internet URL: http://en.wikipedia.org/wiki/Turbofan, on Jan. 3, 2017, pp. 1-21.
Extended European Search Report and Opinion issued in connection with related EP Application No. 16176400.6 dated Nov. 14, 2016.
Extended European Search Report and Opinion issued in connection with related EP Application No. 16176128.3 dated Nov. 15, 2016.
Extended European Search Report and Opinion issued in connection with related EP Application No. 16175821.4 dated Nov. 16, 2016.
Extended European Search Report and Opinion issued in connection with corresponding EP Application No. 16175335.5 dated Nov. 25, 2016.
Extended European Search Report and Opinion issued in connection with related EP Application No. 16176515.1 dated Nov. 28, 2016.
Extended European Search Report and Opinion issued in connection with related EP Application No. 16176652.2 dated Nov. 28, 2016.
Extended European Search Report and Opinion issued in connection with related EP Application No. 16175556.6 dated Nov. 28, 2016.
Extended European Search Report and Opinion issued in connection with related EP Application No. 16176514.4 dated Dec. 2, 2016.
Non-Final Rejection towards related U.S. Appl. No. 14/753,073 dated Dec. 13, 2016.
Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.
Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.
U.S. Appl. No. 14/753,097, Office Action 1 dated Oct. 11, 2017, 53 pages.
U.S. Appl. No. 14/753,107, Office Action 1 dated Oct. 20, 2017, 52 pages.
U.S. Appl. No. 14/753,085, Notice of Allowance dated Oct. 19, 2017, 47 pages.
U.S. Appl. No. 14/753,088, Final Office Action 1 dated Oct. 19, 2017, 32 pages.
U.S. Appl. No. 14/753,073, Office Action 2 dated Nov. 16, 2017, 35 pages.
U.S. Appl. No. 14/753,105, Office Action 1 dated Dec. 11, 2017, 67 pages.
U.S. Appl. No. 14/753,102, Office Action 1 dated Oct. 26, 2017, 53 pages.
U.S. Appl. No. 14/753,093, Final Office Action 1 dated Nov. 1, 2017, 30 pages.
U.S. Appl. No. 14/753,080, Notice of Allowance date Nov. 3, 2017, 48 pages.
U.S. Appl. No. 14/753,097, Final Office Action dated Jan. 29, 2018, 27 pages.
U.S. Appl. No. 14/753,102, Notice of Allowance dated Feb. 16, 2018, 21 pages.
U.S. Appl. No. 14/753,097, Notice of Allowance dated Feb. 22, 2018, 10 pages.
U.S. Appl. No. 14/753,107, Notice of Allowance dated Feb. 22, 2018, 21 pages.
U.S. Appl. No. 14/753,105, Final Office Action dated Apr. 6, 2018, 28 pages.
U.S. Appl. No. 14/753,093, Office Action dated Apr. 18, 2018, 38 pages.
U.S Appl. No. 14/753,073, Final Office Action dated May 22, 2018, 21 pages.

\* cited by examiner

POWER GENERATION SYSTEM EXHAUST COOLING

CROSS-REFERENCE TO RELATED APPLICATIONS

This application is related to co-pending U.S. application numbers: application Ser. No. 14/753,064, application Ser. No. 14/753,066, application Ser. No. 14/753,072, application Ser. No. 14/753,073, application Ser. No. 14/753,074, application Ser. No. 14/753,080, application Ser. No. 14/753,085, application Ser. No. 14/753,088, application Ser. No. 14/753,093, application Ser. No. 14/753,102, application Ser. No. 14/753,107, application Ser. No. 14/753,097, and application Ser. No. 14/753,105, all filed on Jun. 29, 2015.

BACKGROUND OF THE INVENTION

The disclosure relates generally to power generation systems, and more particularly, to systems and methods for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_R$), which includes, for example, nitric oxide and nitrogen dioxide. To remove the $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

BRIEF DESCRIPTION OF THE INVENTION

A first aspect of the disclosure provides an airflow control system for a gas turbine system, including: a compressor component of a gas turbine system; an airflow generation system for attachment to a rotatable shaft of the gas turbine system, the airflow generation system and the compressor component drawing in an excess flow of air through an air intake section, the airflow generation system and the compressor component drawing in an excess flow of air through an air intake section; a mixing area for receiving an exhaust gas stream produced by the gas turbine system; and an air extraction system for extracting at least a portion of the excess flow of air generated by the airflow generation system and the compressor component to provide bypass air, and for diverting the bypass air into the mixing area to reduce a temperature of the exhaust gas stream.

A second aspect of the disclosure provides a turbomachine system, including: a gas turbine system including a compressor component, a combustor component, and a turbine component, wherein the compressor component of the gas turbine system includes at least one oversized compressor stage; a shaft driven by the turbine component; a fan coupled to the shaft upstream of the gas turbine system, the fan and the at least one oversized compressor stage of the compressor component drawing in an excess flow of air through an air intake section; a mixing area for receiving an exhaust gas stream produced by the gas turbine system; an air extraction system for: extracting at least a portion of the excess flow of air generated by the fan and the at least one oversized compressor stage of the compressor component to provide bypass air; and diverting the bypass air into the mixing area to reduce a temperature of the exhaust gas stream; and an exhaust processing system for processing the reduced temperature exhaust gas stream.

A third aspect of the disclosure provides a power generation system, including: a gas turbine system including a compressor component, a combustor component, and a turbine component, wherein the compressor component of the gas turbine system includes at least one oversized compressor stage; a shaft driven by the turbine component; an electrical generator coupled to the shaft for generating electricity; a fan coupled to the shaft upstream of the gas turbine system, the fan and the at least one oversized compressor stage of the compressor component drawing in an excess flow of air through an air intake section; a mixing area for receiving an exhaust gas stream produced by the gas turbine system; an air extraction system for: extracting at least a portion of the excess flow of air generated by the fan and the at least one oversized compressor stage of the compressor component to provide bypass air; and diverting the bypass air into the mixing area to reduce a temperature of the exhaust gas stream; and an exhaust processing system for processing the reduced temperature exhaust gas stream.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figure 1:
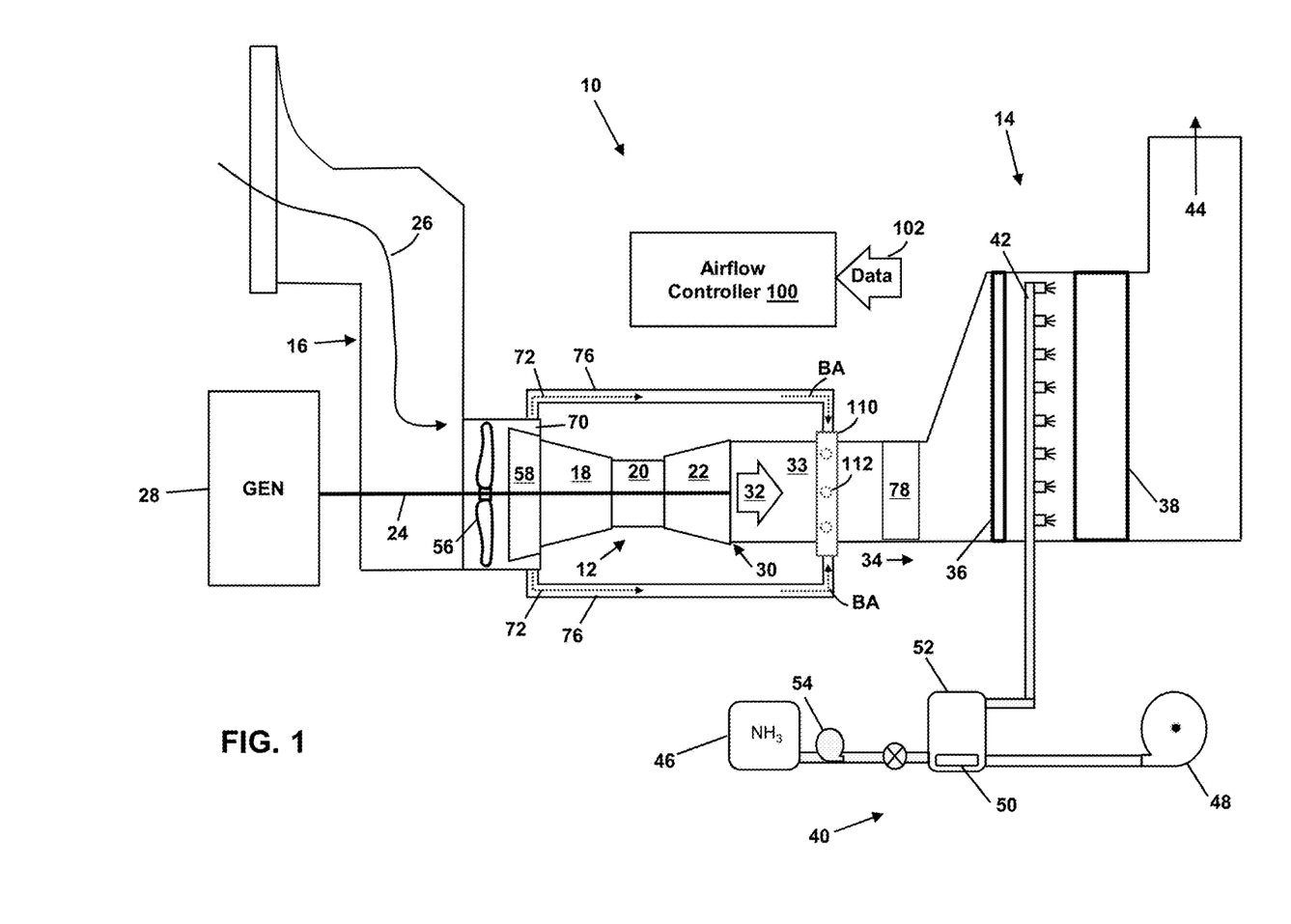
FIG. 1 shows a schematic diagram of a simple cycle gas turbine power generation system according to embodiments.
Figure 3:
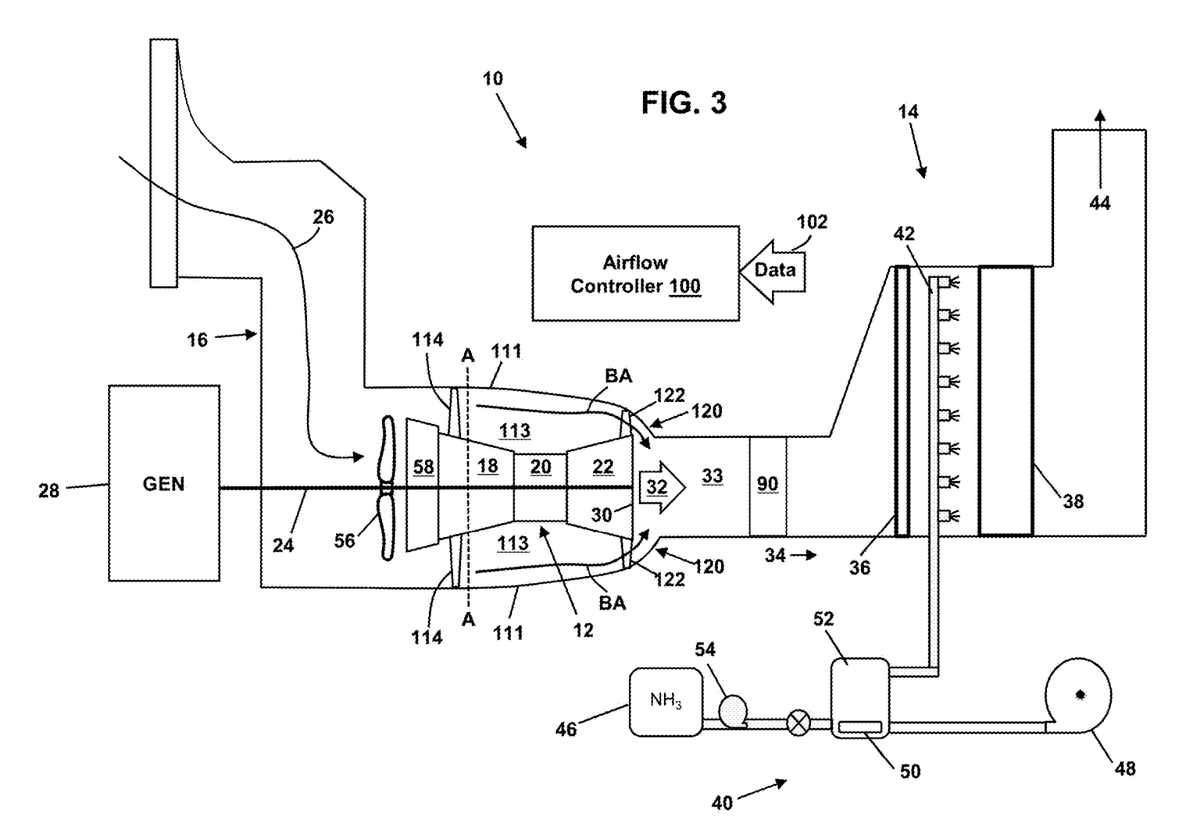
FIG. 3 shows a schematic diagram of a simple cycle gas turbine power generation system according to embodiments.

FIGS. 1 and 3 depict block diagrams turbomachine systems (e.g., simple cycle gas turbine power generation systems 10) that include a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine.

The combustion gases that flow through the turbine component 22 exit the downstream end 30 of the turbine component 22 as a stream of exhaust gas 32. The exhaust gas stream 32 may continue to flow in a downstream direction 34 towards the exhaust processing system 14. The downstream end 30 of the turbine component 22 may be fluidly coupled via a mixing area 33 to a CO removal system (including, e.g., a CO catalyst 36) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIGS. 1 and 3, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, a fan 56 and an "oversized" compressor component 18 may be used in combination to provide cooling air for lowering the temperature of the exhaust gas stream 32 to a level suitable for the SCR catalyst 38. As depicted in FIG. 1, the fan 56 may be coupled to the shaft 24 of the gas turbine system 12 upstream of the gas turbine system 12 to provide cooling air (e.g., ambient air) drawn in through the air intake section 16 that may be used to lower the temperature of the exhaust gas stream 32. The fan 56 may be fixedly mounted (e.g. bolted, welded, etc.) to the shaft 24 of the gas turbine system 12. To this extent, the fan 56 is configured to rotate at the same rotational speed as the shaft 24. In other embodiments, a clutch mechanism may used to releasably couple the fan 56 to the shaft 24 of the gas turbine system 12. This allows the fan 56 to be selectively decoupled from the shaft 24 if not needed. When the clutch mechanism is engaged, the fan 56 is coupled to the shaft 24 and is configured to rotate at the same rotational speed as the shaft 24. Clutch coupling/decoupling commands may be provided to the clutch mechanism via an airflow controller 100. An adjustable speed drive system may also be used to couple the fan 56 to the shaft 24 to allow the fan 56 to be rotated at a different speed than the shaft 24.

The compressor component 18 has a flow rate capacity and is configured to draw in a flow of air (ambient air) via the air intake section 16 based on its flow rate capacity. The flow rate capacity of the combination of the fan 56 and the compressor component 18 may be about 10% to about 40% greater than the flow rate capacity of at least one of the combustor component 20 and the turbine component 22, creating an excess flow of air. That is, at least one of the combustor component 20 and the turbine component 22 cannot take advantage of all of the air provided by the combination of the fan 56 and compressor component 18, and an excess flow of air is created. This excess flow of air may be used to cool the exhaust gas stream 32 of the gas turbine system 12. According to embodiments, at least one of the compressor stages 58 of the compressor component 18 may be "oversized" in order to provide at least some of the excess flow of air. As detailed below, the 10% to 40% additional flow of air may be used to cool the exhaust gas stream 32 and, if desired, to supercharge the gas turbine system 12. Use of a single oversized compressor stage 58 is described below; however, this is not intended to be limiting and additional oversized compressor stages 58 may be used in other embodiments. In general, the percentage increase in the flow of air may be varied and selectively controlled based on several factors including the load on the gas turbine system 12, the temperature of the air being drawn into the gas turbine system 12, the temperature of the exhaust gas stream 32 at the SCR catalyst 38, etc.

Figure 2:
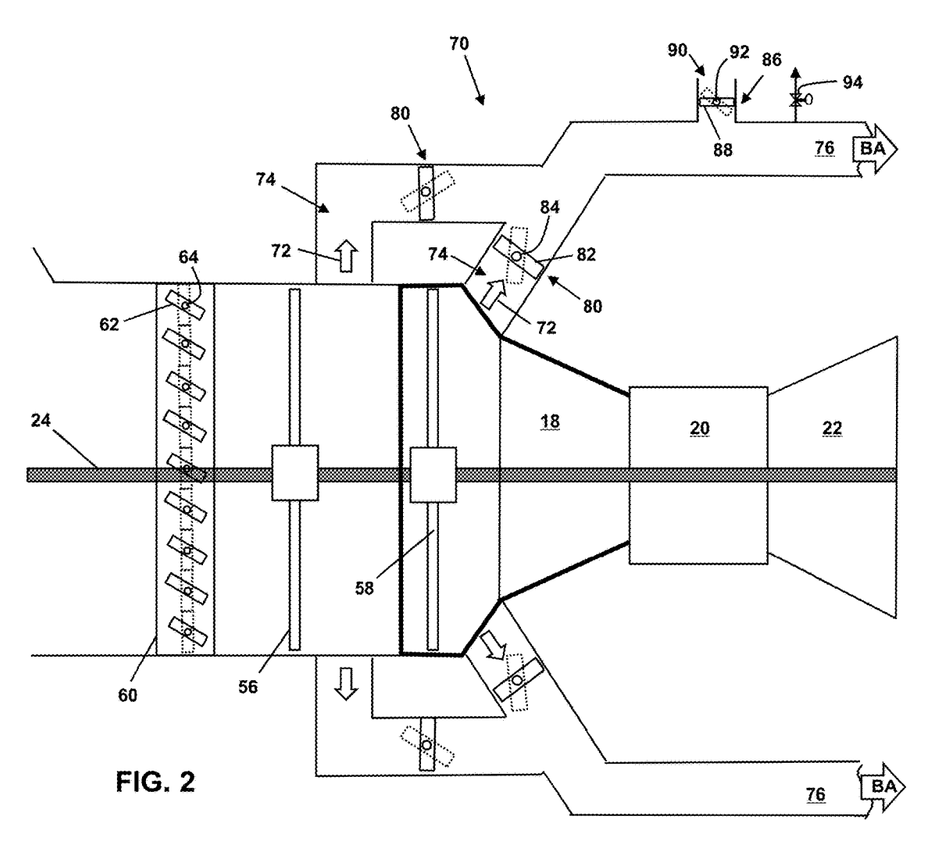
FIG. 2 depicts an enlarged view of a portion of the gas turbine power generation system of FIG. 1 according to embodiments.

As depicted in FIG. 2, an inlet guide vane assembly 60 including a plurality of inlet guide vanes 62 may be used to control the amount of air available to the fan 56 and the compressor component 18. Each inlet guide vane 62 may be selectively controlled (e.g., rotated) by an independent actuator 64. The actuators 64 are shown schematically in FIG. 2, but any known actuator may be utilized. For example, the actuators 64 may comprise an electro-mechanical motor, or any other type of suitable actuator.

The actuators 64 may be independently and/or collectively controlled in response to commands from the airflow controller 100 to selectively vary the positioning of the inlet guide vanes 62. That is, the inlet guide vanes 62 may be selectively rotated about a pivot axis by the actuators 64. In embodiments, each inlet guide vane 62 may be individually pivoted independently of any other inlet guide vane 62. In other embodiments, groups of inlet guide vanes 62 may be pivoted independently of other groups of inlet guide vanes 62 (i.e., pivoted in groups of two or more such that every inlet guide vane 62 in a group rotates together the same amount). Position information (e.g., as sensed by electro-mechanical sensors or the like) for each of the inlet guide vanes 62 may be provided to the airflow controller 100.

The increased flow of air provided by the combination of the fan 56 and the oversized compressor stage 58 of the compressor component 18 may increase the air pressure at the compressor component 18. For example, the increased flow of air provided by the operation of the fan 56 and the oversized compressor stage 58 of the compressor component 18 may provide a pressure increase of about 5 to about 15 inches of water. This pressure increase may be used to overcome pressure drop and facilitate proper mixing (described below) of cooler air with the exhaust gas stream 32 in the downstream exhaust processing system 14. The pressure increase may also be used to supercharge the gas turbine system 12.

Referring to FIGS. 1 and 2, an air extraction system 70 may be employed to extract at least some of the additional flow of air provided by the fan 56 and the oversized compressor stage 58 of the compressor component 18. A flow of air 72 may be extracted using, for example, one or more extraction ducts 74 (FIG. 2). The extracted air, or "bypass air" (BA) does not enter the gas turbine system 12, but is instead directed to the mixing area 33 through bypass ducts 76 as indicated by arrows BA, where the bypass air may be used to cool the exhaust gas stream 32. The remaining air (i.e., any portion of the additional flow of air not extracted via the extraction ducts 74) enters the compressor component 18 of the gas turbine system 12 and flows through the gas turbine system 12 in a normal fashion. If the flow of remaining air is greater than the flow rate capacity of the gas turbine system 12, a supercharging of the gas turbine system 12 may occur, increasing the efficiency and power output of the gas turbine system 12.

The bypass air may be routed toward the mixing area 33 downstream of the turbine component 22 through one or more bypass ducts 76. The bypass air exits the bypass ducts 76 and enters the mixing area 33 through a bypass air injection grid 110 (FIG. 1), where the bypass air (e.g., ambient air) mixes with and cools the exhaust gas stream 32 to a temperature appropriate for use with the SCR catalyst 38. In embodiments, the temperature of the exhaust gas stream 32 generated by the gas turbine system 12 is cooled by the bypass air from about 1100° F. to less than about 900° F. in the mixing area 33. The bypass air injection grid 110 may comprise, for example, a plurality of nozzles 112 or the like for directing (e.g., injecting) the bypass air into the mixing area 33. The nozzles 112 of the bypass air injection grid 110 may be distributed about the mixing area 33 in such a way as to maximize mixing of the bypass air and the exhaust gas stream 32 in the mixing area 33. The nozzles 112 of the bypass air injection grid 110 may be fixed in position and/or may be movable to selectively adjust the injection direction of bypass air into the mixing area 33.

A supplemental mixing system 78 (FIG. 1) may be positioned within the mixing area 33 to enhance the mixing process. The supplemental mixing system 78 may comprise, for example, a static mixer, baffles, and/or the like. The CO catalyst 36 may also help to improve the mixing process by adding back pressure (e.g., directed back toward the turbine component 22).

As depicted in FIG. 2, the air flow 72 into each extraction duct 74 may be selectively and/or independently controlled using a flow restriction system 80 comprising, for example, a damper 82, guide vane, or other device capable of selectively restricting airflow. Each damper 82 may be selectively and controlled (e.g., rotated) by an independent actuator 84. The actuators 84 may comprise electro-mechanical motors, or any other type of suitable actuator. The dampers 82 may be independently and/or collectively controlled in response to commands from the airflow controller 100 to selectively vary the positioning of the dampers 82 such that a desired amount of bypass air is directed into the mixing area 33 via the bypass ducts 76. Position information (e.g., as sensed by electro-mechanical sensors or the like) for each of the dampers 82 may be provided to the airflow controller 100.

Bypass air may be selectively released from one or more of the bypass ducts 76 using an air release system 86 comprising, for example, one or more dampers 88 (or other devices capable of selectively restricting airflow, e.g. guide vanes) located in one or more air outlets 90. The position of a damper 88 within an air outlet 90 may be selectively controlled (e.g., rotated) by an independent actuator 92. The actuator 92 may comprise an electro-mechanical motor, or any other type of suitable actuator. Each damper 88 may be controlled in response to commands from the airflow controller 100 to selectively vary the positioning of the damper 88 such that a desired amount of bypass air may be released from a bypass duct 76. Position information (e.g., as sensed by electro-mechanical sensors or the like) for each damper 88 may be provided to the airflow controller 100. Further airflow control may be provided by releasing bypass air from one or more of the bypass ducts 76 through one or more metering valves 94 controlled via commands from the airflow controller 100.

Figure 7:
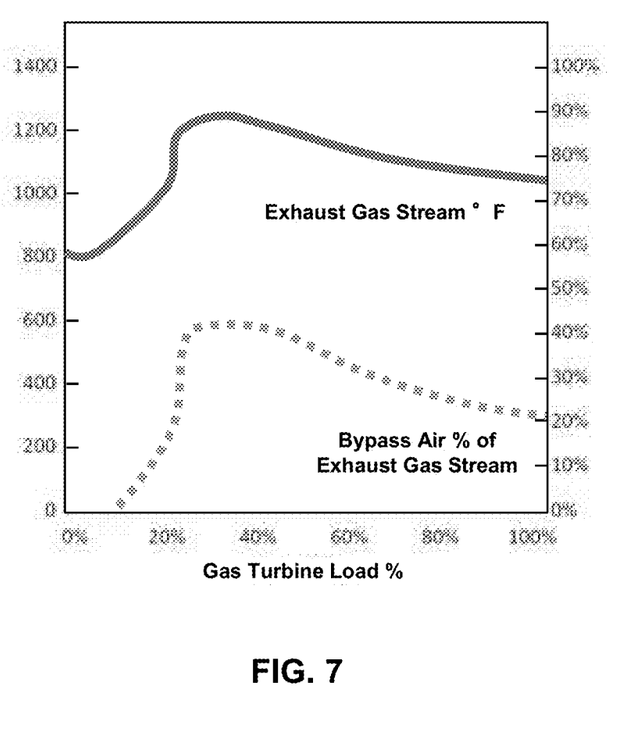
FIG. 7 is a chart showing an illustrative relationship between the flow of bypass air into a mixing area and the temperature of the exhaust gas stream at different load percentages of a gas turbine system, according to embodiments.

The airflow controller 100 may be used to regulate the amount of air generated by the fan 56 and the oversized compressor stage 58 of the compressor component 18 that is diverted as bypass air through the bypass ducts 76 and into the mixing area 33 relative to the amount of air that enters the gas turbine system 12 (and exits as the exhaust gas stream 32) in order to maintain a suitable temperature at the SCR catalyst 38 under varying operating conditions. A chart showing an illustrative relationship between the flow of bypass air into the mixing area 33 and the temperature of the exhaust gas stream 32 at different load percentages of the gas turbine system 12 is provided in FIG. 7. In this example, the chart in FIG. 7 depicts: 1) temperature variation of an exhaust gas stream 32 of a gas turbine system 12 at different load percentages of the gas turbine system 12; and 2) corresponding variation in the flow of bypass air as a percentage of the exhaust gas stream 32 (bypass ratio) needed to maintain the temperature at the SCR catalyst 38 at an appropriate level (e.g., 900° F.) at different load percentages of the gas turbine system 12. As represented in the chart in FIG. 7, the amount of bypass air flowing through the bypass ducts 76 into the mixing area 33 may be varied (e.g., under control of the airflow controller 100) as the temperature of the exhaust gas stream 32 changes, in order to regulate the temperature at the SCR catalyst 38.

The airflow controller 100 may receive data 102 associated with the operation of the gas turbine power generation system 10. Such data may include, for example, the temperature of the exhaust gas stream 32 as it enters the mixing area 33, the temperature of the exhaust gas stream 32 at the SCR catalyst 38 after mixing/cooling has occurred in the mixing area 33, the temperature of the air drawn into the air intake section 16 by the fan 56 and the compressor component 18 of the gas turbine system 12, and other temperature data obtained at various locations within the gas turbine power generation system 10. The data 102 may further include airflow and pressure data obtained, for example, within the air intake section 16, at the inlet guide vanes 62, at the fan 56, at the entrance of the oversized compressor stage 58 and/or other stages of the compressor component 18, within the extraction ducts 74, within the bypass ducts 76, at the downstream end 30 of the turbine component 22, and at various other locations within the gas turbine power generation system 10. Load data, fuel consumption data, and other information associated with the operation of the gas turbine system 12 may also be provided to the airflow controller 100. The airflow controller 100 may further receive positional information associated with the inlet guide vanes 62, dampers 82 and 88, valve 94, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to vary as needed the amount of bypass air flowing through the bypass ducts 76 into the mixing area 33 to maintain the temperature at the SCR catalyst 38 at a suitable level. This may be achieved, for example, by varying at least one of: the flow of air drawn into the air intake section 16 by the combined action of the fan 56 and the compressor component 18 of the gas turbine system 12 (this flow may be controlled, for example, by adjusting the position of one or more of the inlet guide vanes 62 and/or by increasing the rotational speed of the shaft 24); the flow of air 72 into the extraction ducts 74 (this flow may be controlled, for example, by adjusting the position of one or more of the dampers 82); and the flow of bypass air passing from the extraction ducts 74, through the bypass ducts 76, into the mixing area 33 (this flow may be controlled, for example, by adjusting the position of one or more of the dampers 88 and/or the operational status of the metering valves 94).

The airflow controller 100 may include a computer system having at least one processor that executes program code configured to control the amount of bypass air flowing through the bypass ducts 76 into the mixing area 33 using, for example, data 102 and/or instructions from human operators. The commands generated by the airflow controller 100 may be used to control the operation of various components (e.g., such as actuators 64, 84, 92, valve 94, and/or the like) in the gas turbine power generation system 10. For example, the commands generated by the airflow controller 100 may be used to control the operation of the actuators 64, 84, and 92 to control the rotational position of the inlet guide vanes 62, dampers 82, and dampers 88, respectively. Commands generated by the airflow controller 100 may also be used to activate other control settings in the gas turbine power generation system 10.

Figure 4:
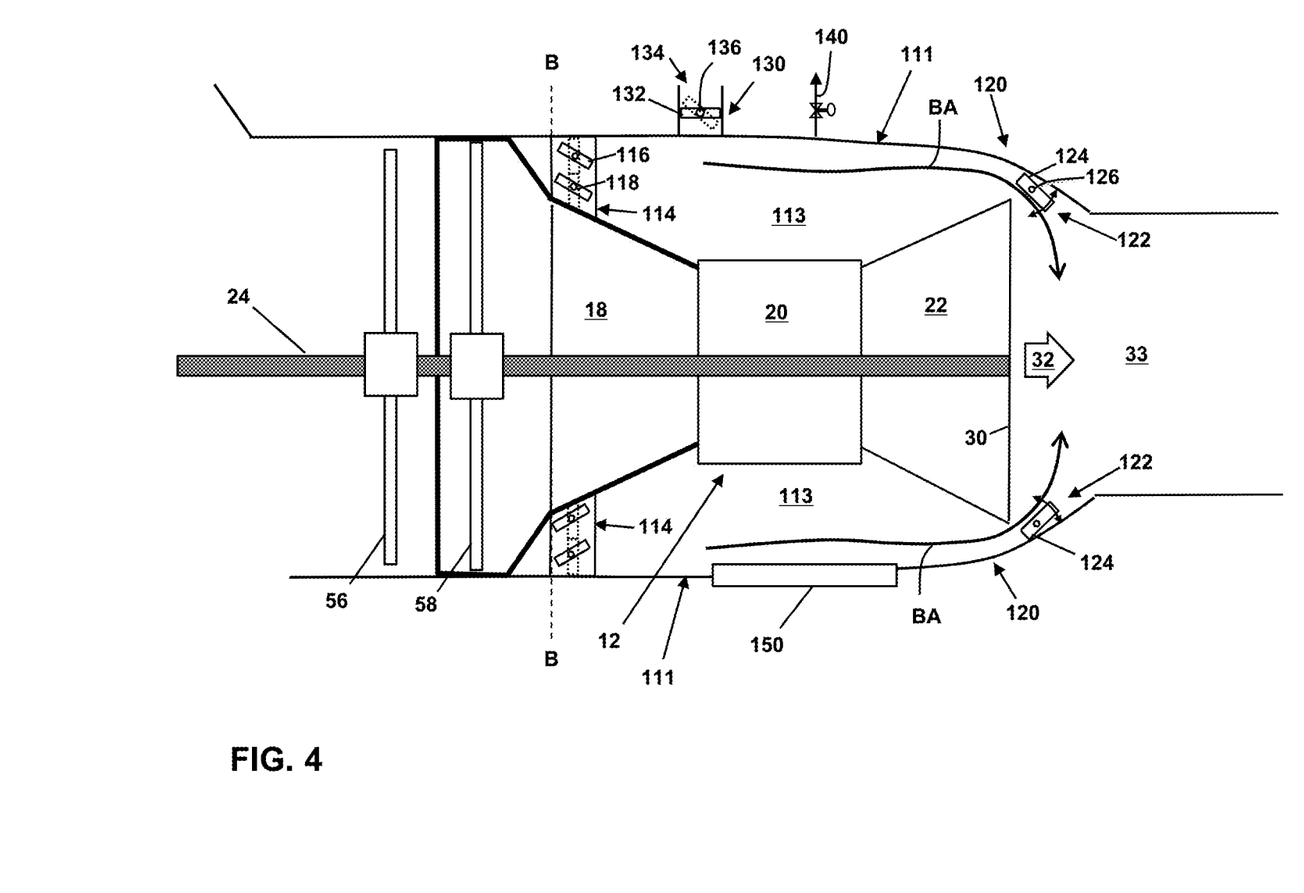
FIG. 4 depicts an enlarged view of a portion of the gas turbine power generation system of FIG. 3 according to embodiments.
Figure 5:
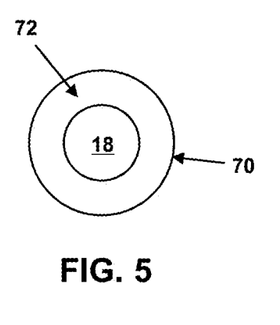
FIG. 5 is an illustrative cross-sectional view of the bypass enclosure and the compressor component of the gas turbine system taken alone line A-A of FIG. 3.

As depicted in FIGS. 3 and 4, instead of using external bypass ducts 76, the gas turbine system 12 may be surrounded by a bypass enclosure 111. The bypass enclosure 111 extends from, and fluidly couples, the air intake section 16 to the mixing area 33. The bypass enclosure 111 may have any suitable configuration. For instance, the bypass enclosure 111 may have an annular configuration as depicted in FIG. 5, which is a cross-section taken along line A-A in FIG. 3. The bypass enclosure 111 forms an air passage 113 around the gas turbine system 12 through which a supply of cooling bypass air (BA) may be provided for cooling the exhaust gas stream 32 of the gas turbine system 12.

Figure 6:
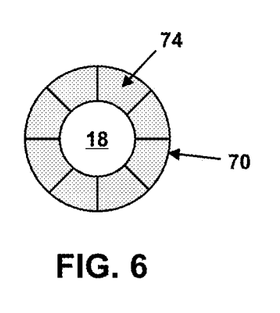
FIG. 6 is an illustrative cross-sectional view of the bypass enclosure and the compressor component of the gas turbine system taken alone line B-B of FIG. 4.

An air extraction system 114 may be provided to extract at least some of the additional flow of air provided by the fan 56 and the oversized compressor stage 58 of the compressor component 18 and to direct the extracted air into the air passage 113 formed between the bypass enclosure 111 and the gas turbine system 12. The air extraction system 114 may comprise, for example, inlet guide vanes, a stator, or any other suitable system for selectively directing a flow of air into the air passage 113. In the following description, the air extraction system 114 comprises, but is not limited to, inlet guide vanes. As shown in FIG. 6, which is a cross-section taken along line B-B in FIG. 4, the air extraction system 114 may extend completely around the entrance to the air passage 113 formed between the bypass enclosure 111 and the compressor component 18 of the gas turbine system 12.

As depicted in FIG. 4, the air extraction system 114 may include a plurality of inlet guide vanes 116 for controlling the amount of air directed into the air passage 113 formed between the bypass enclosure 111 and the gas turbine system 12. Each inlet guide vane 116 may be selectively and independently controlled (e.g., rotated) by an independent actuator 118. The actuators 118 are shown schematically in FIG. 4, but any known actuator may be utilized. For example, the actuators 118 may comprise an electro-mechanical motor, or any other type of suitable actuator.

The actuators 118 of the air extraction system 114 may be independently and/or collectively controlled in response to commands from the airflow controller 100 to selectively vary the positioning of the inlet guide vanes 116. That is, the inlet guide vanes 116 may be selectively rotated about a pivot axis by the actuators 118. In embodiments, each inlet guide vane 116 may be individually pivoted independently of any other inlet guide vane 116. In other embodiments, groups of inlet guide vanes 116 may be pivoted independently of other groups of inlet guide vanes 116 (i.e., pivoted in groups of two or more such that every inlet guide vane 116 in a group rotates together the same amount). Position information (e.g., as sensed by electro-mechanical sensors or the like) for each of the inlet guide vanes 116 may be provided to the airflow controller 100.

The bypass air does not enter the gas turbine system 12, but is instead directed to the mixing area 33 through the air passage 113 as indicated by arrows BA, where the bypass air may be used to cool the exhaust gas stream 32. The remaining air (i.e., any portion of the additional flow of air generated by the fan 56 and the oversized compressor stage 58 not extracted via the air extraction system 114) enters the compressor component 18 of the gas turbine system 12 and flows through the gas turbine system 12 in a normal fashion. If the flow of remaining air is greater than the flow rate capacity of the gas turbine system 12, a supercharging of the gas turbine system 12 may occur, increasing the efficiency and power output of the gas turbine system 12.

The bypass air flows toward and into the mixing area 33 downstream of the turbine component 22 through the air passage 113. In embodiments, the bypass air exits the air passage 113 and is directed at an angle toward and into the exhaust gas stream 32 in the mixing area 33 to enhance mixing. In the mixing area 33, the bypass air (e.g., ambient air) mixes with and cools the exhaust gas stream 32 to a temperature suitable for use with the SCR catalyst 38. In embodiments, the temperature of the exhaust gas stream 32 generated by the gas turbine system 12 is cooled by the bypass air from about 1100° F. to less than about 900° F. in the mixing area 33.

As depicted in FIGS. 3 and 4, the distal end 120 of the bypass enclosure 111 may curve inwardly toward the mixing area 33 to direct the bypass air at an angle toward and into the exhaust gas stream 32 in the mixing area 33. The intersecting flows of the bypass air and the exhaust gas stream 32 may facilitate mixing, thereby enhancing the cooling of the exhaust gas stream 32. A flow directing system 122 may also be provided to direct the bypass air at an angle toward and into the exhaust gas stream 32. Such a flow directing system 122 may include, for example, outlet guide vanes, stators, nozzles, or any other suitable system for selectively directing the flow of bypass air into the mixing area 33.

An illustrative flow directing system 122 is shown in FIG. 4. In this example, the flow directing system 122 includes a plurality of outlet guide vanes 124. Each outlet guide vane 124 may be selectively controlled (e.g., rotated) by an independent actuator 126. The actuators 126 are shown schematically in FIG. 4, but any known actuator may be utilized. For example, the actuators 126 may comprise an electro-mechanical motor, or any other type of suitable actuator. In embodiments, the flow directing system 122 may extend completely around the exit of the air passage 113 formed between the bypass enclosure 111 and the turbine component 22 of the gas turbine system 12.

A supplemental mixing system 78 (FIG. 1) may be positioned within the mixing area 33 to enhance the mixing process. The supplemental mixing system 78 may comprise, for example, a static mixer, baffles, and/or the like. The CO catalyst 36 may also help to improve the mixing process by adding back pressure (e.g., directed back toward the turbine component 22).

As shown in FIG. 4, bypass air may be selectively released from the bypass enclosure 111 using an air release system 130 comprising, for example, one or more dampers 132 (or other devices capable of selectively restricting airflow, e.g. guide vanes) located in one or more air outlets 134. The position of a damper 132 within an air outlet 134 may be selectively controlled (e.g., rotated) by an independent actuator 136. The actuator 136 may comprise an electro-mechanical motor, or any other type of suitable actuator. Each damper 132 may be controlled in response to commands from the airflow controller 100 to selectively vary the positioning of the damper 132 such that a desired amount of bypass air may be released from the bypass enclosure 111. Position information (e.g., as sensed by electro-mechanical sensors or the like) for each damper 132 may be provided to the airflow controller 100. Further airflow control may be provided by releasing bypass air from the bypass enclosure 111 through one or more metering valves 140 (FIG. 4) controlled via commands from the airflow controller 100.

The airflow controller 100 may be used to regulate the amount of air generated by the fan 56 and the oversized compressor stage 58 of the compressor component 18 that is diverted as bypass air into the mixing area 33 through the air passage 113 relative to the amount of air that enters the gas turbine system 12 (and exits as the exhaust gas stream 32) in order to maintain a suitable temperature at the SCR catalyst 38 under varying operating conditions. The amount of bypass air flowing through the air passage 113 into the mixing area 33 may be varied (e.g., under control of the airflow controller 100) as the temperature of the exhaust gas stream 32 changes, in order to regulate the temperature at the SCR catalyst 38.

As shown schematically in FIG. 4, the bypass enclosure 111 may be provided with one or more access doors 150. The access doors 150 provide access through the bypass enclosure 111 to the various components of the gas turbine system 12 (e.g., for servicing, repair, etc.).

As detailed above, the airflow controller 100 may receive a wide variety of data 102 associated with the operation of the gas turbine power generation system 10 and the components thereof. Based on the received data 102, the airflow controller 100 is configured to vary as needed the amount of bypass air flowing through the air passage 113 into the mixing area 33 to regulate the temperature at the SCR catalyst 38. This may be achieved, for example, by varying at least one of: the flow of air drawn into the air intake section 16 by the fan 56 and compressor component 18 of the gas turbine system 12; the flow of air directed into the air passage 113 via the air extraction system 114 (this flow may be controlled, for example, by adjusting the position of one or more of the inlet guide vanes 116); and the flow of bypass air passing through the air passage 113 into the mixing area 33 (this flow may be controlled, for example, by adjusting the position of one or more of the dampers 132 and/or the operational status of the metering valves 140).

The use of a fan 56 and a compressor component 18 including an oversized compressor stage 58 in lieu of conventional large external blower systems and/or other conventional cooling structures provides many advantages. For example, the need for redundant external blower systems and associated components (e.g., blowers, motors and associated air intake structures, filters, ducts, etc.) is eliminated. This reduces manufacturing and operating costs, as well as the overall footprint, of the gas turbine power generation system 10. The footprint is further reduced as the fan 56 and oversized compressor stage 58 draw in air through an existing air intake section 16, rather than through separate, dedicated intake structures often used with external blower systems.

Use of the fan 56 and oversized compressor stage 58 provides a more reliable and efficient gas turbine power generation system 10. For example, since the bypass air used for cooling in the mixing area 33 is driven by the shaft 24 of the gas turbine system 12 itself, large external blower systems are no longer required. Further, at least a portion of the flow of air generated by the fan 56 and oversized compressor stage 58 may be used to supercharge the gas turbine system 12.

Power requirements of the gas turbine power generation system 10 are reduced because the fan 56 and oversized compressor stage 58 are coupled to, and driven by, the shaft 24 of the gas turbine system 12. This configuration eliminates the need for large blower motors commonly used in conventional external blower cooling systems.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a gas turbine system, comprising:
   a compressor component of the gas turbine system, the compressor component including a first set of compressor stages for generating a first excess flow of air and a second set of compressor stages, the gas turbine system further including a combustor component and a turbine component;
   an airflow generation system for attachment to a rotatable shaft of the gas turbine system upstream of the compressor component, the airflow generation system drawing in a second excess flow of air;
   a mixing area for receiving an exhaust gas stream from the turbine component of the gas turbine system;
   an air extraction system for extracting at least a portion of the first excess flow of air generated by the first set of compressor stages of the compressor component, and for extracting at least a portion of the second excess flow of air generated by the airflow generation system, to provide bypass air, and for diverting the bypass air through a bypass duct completely around the combustor component and the turbine component of the gas turbine system into the mixing area to reduce a temperature of the exhaust gas stream;
   wherein the air extraction system includes a duct system for providing bypass air, the duct system including an a first extraction duct, a second extraction duct, and the bypass duct, wherein the first extraction duct extracts at least a portion of the first excess flow of air generated by the first set of compressor stages to provide a first portion of the bypass air, and diverts the first portion of the bypass air into the bypass duct, and wherein the second extraction duct extracts at least a portion of the second excess flow of air generated by the airflow generation system to provide a second portion of the bypass air, and diverts the second portion of the bypass air into the bypass duct;
   a flow restriction system for selectively restricting airflow through at least one of the first and second extraction ducts, the flow restriction system including an actively controlled damper assembly for regulating the airflow through the at least one of the first and second extraction ducts into the bypass duct; and an actively controlled air release system upstream from the mixing area for selectively releasing a portion of the bypass air from the bypass duct to an exterior of the turbine system to control the temperature of the exhaust.

2. The airflow control system of claim 1, wherein the first and second excess flow of air generated by the airflow generation system and the compressor component is 10% to 40% greater than a flow rate capacity of at least one of the combustor component and the component of the gas turbine system.

3. The airflow control system of claim 1, wherein the compressor component of the gas turbine system has an airflow output greater than a flow rate capacity of the combustor component.

4. The airflow control system of claim 1, wherein the airflow generation system comprises a fan.

5. The airflow control system of claim 1, wherein the air extraction system is configured to divert a portion of the second excess flow of air into the compressor component.

6. The airflow control system of claim 1, further comprising a selective catalytic reduction (SCR) system for processing the reduced temperature exhaust gas stream.

7. A turbomachine system, comprising:
a gas turbine system including a compressor component, a combustor component, and a turbine component, wherein the compressor component of the gas turbine system has an airflow output greater than a flow rate capacity of the combustor component, the compressor component including a first set of compressor stages for generating a first excess flow of air and a second set of compressor stages;
a shaft driven by the turbine component;
a fan coupled to the shaft upstream of the compressor component of the gas turbine system, the fan and the compressor component drawing in a second excess flow of air;
a mixing area for receiving an exhaust gas stream from the turbine component of the gas turbine system;
an air extraction system for: extracting at least a portion of the second excess flow of air generated by the fan and for extracting at least a portion of the first excess flow of air generated by the first set of compressor stages of the compressor component to provide bypass air; and diverting the bypass air through a bypass duct completely around the combustor component and the turbine component of the gas turbine system into the mixing area to reduce a temperature of the exhaust gas stream;
an exhaust processing system for processing the reduced temperature exhaust gas stream;
wherein the air extraction system includes a duct system for providing bypass air, the duct system including a first extraction duct, a second extraction duct, and the bypass duct, wherein the first extraction duct extracts at least a portion of the first excess flow of air generated by the first set of compressor stages to provide a first portion of the bypass air, and diverts the first portion of the bypass air into the bypass duct, and wherein the second extraction duct extracts at least a portion of the second excess flow of air generated by the airflow generation system to provide a second portion of the bypass air, and diverts the second portion of the bypass air into the bypass duct;
a flow restriction system for selectively restricting airflow through at least one of the first and second extraction duct, the flow restriction system including an actively controlled damper assembly for regulating the airflow through the at least one of the first and second extraction duct into the bypass duct;

and an actively controlled air release system upstream from the mixing area for selectively releasing a portion of the bypass air from the bypass duct to an exterior of the turbine system to control the temperature of the exhaust.

8. The turbomachine system of claim 7, wherein the first and second excess flow of air generated by the fan and the compressor component is 10% 40% greater than a flow rate capacity of at least one of the combustor component and the turbine component of the gas turbine system.

9. The turbomachine system of claim 7, wherein the air extraction system is configured to divert a portion of the second excess flow of air into the compressor component.

10. The turbomachine system of claim 7, wherein the exhaust processing system comprises a selective catalytic reduction (SCR) system.

* * * * *